(12) United States Patent
Sabin (10) Patent No.: US 6,761,042 B1
(45) Date of Patent: Jul. 13, 2004

(54) DISPERSION OF REFRIGERANT MATERIALS

(75) Inventor: Martin W. Sabin, Sarasota, FL (US)

(73) Assignee: Tempra Technology, Inc., Bradenton, FL (US)

( * ) Notice: Subject to any disclaimer, the term of this patent is extended or adjusted under 35 U.S.C. 154(b) by 0 days.

(21) Appl. No.: 10/169,306

(22) PCT Filed: Feb. 24, 2000

(86) PCT No.: PCT/US00/04639

§ 371 (c)(1),
(2), (4) Date: Oct. 24, 2002

(87) PCT Pub. No.: WO00/50824

PCT Pub. Date: Aug. 31, 2000

Related U.S. Application Data (60) Provisional application No. 60/121,744, filed on Feb. 26, 1999.

(51) Int. Cl.$^7$ .......................... F25B 15/00; F25B 17/08; F25B 21/00; F25D 3/10

(52) U.S. Cl. ................ 62/480; 62/457.9; 62/294; 62/101; 62/104.12

(58) Field of Search ................ 62/480, 457.9, 62/294, 101, 104.12

(56) References Cited

U.S. PATENT DOCUMENTS

| | | | | |
|---|---|---|---|---|
| 5,018,368 A | * | 5/1991 | Steidl et al. | 62/480 |
| 5,168,708 A | | 12/1992 | Siegel | |
| 5,186,020 A | * | 2/1993 | Rockenfeller et al. | 62/457.9 |
| 6,474,100 B1 | * | 11/2002 | Smith et al. | 62/480 |

\* cited by examiner

*Primary Examiner*—William C. Doerrler
*Assistant Examiner*—Filip Zec
(74) *Attorney, Agent, or Firm*—Fish & Richardson P.C.

(57) ABSTRACT

Portable refrigeration devices (1) including methods for preparing evaporator chambers (10) for use in such devices, and the evaporator chambers (10) prepared in this way. The methods relate to the dispersion of refrigerant for the maximization of efficiency of vaporization of refrigerant vapor from the evaporator chamber (10) of such refrigeration devices (1).

21 Claims, 3 Drawing Sheets

DISPERSION OF REFRIGERANT MATERIALS

This application claims the benefit of Provisional application Ser. No. 60/121,744, filed Feb. 26, 1999.

BACKGROUND OF THE INVENTION

The invention relates to self-refrigerating devices employing evaporation/condensation processes. Specifically the invention relates to methods for the preparation of refrigerant materials useful in such devices, and the refrigerant materials resulting from these preparation methods.

Self-refrigerating devices are known in the art. Many products, including liquid products, have more favorable properties when cold than when at ambient temperatures. Thus, cooling of these products to temperatures of between about 0° C. and 20° C. is desirable. Generally, such cooling is carried out by electrically-powered refrigeration units, or by means of a phase change material such as ice. The use of these units to cool such foods and beverages is not always practical because refrigerators generally require a source of electricity, they are not usually portable, and they do not cool the food or beverage quickly.

An alternate method for providing a cooled material on demand is to use portable insulated containers. However, these containers function merely to maintain the previous temperature of the food or beverage placed inside them, or they require the use of ice cubes to provide the desired cooling effect. When used in conjunction with ice, insulated containers are much more bulky and heavy than the food or beverage. Moreover, in many locations, ice may not be readily available when the cooling action is required.

Ice cubes have also been used independently to cool food or beverages rapidly. However, use of ice independently for cooling is often undesirable because ice may be stored only for limited periods above 0° C. Moreover, ice may not be available when the cooling action is desired.

In addition to food and beverage cooling, there are a number of other applications for which a portable cooling device is extremely desirable. These include medical applications, including cooling of tissues or organs; preparation of cold compresses and cryogenic destruction of tissues as part of surgical procedures; industrial applications, including production of cold water or other liquids upon demand; preservation of biological specimens; cooling of protective clothing; and cosmetic applications. A portable cooling apparatus could have widespread utility in all these areas.

Most attempts to build a self-contained miniaturized cooling device have depended on the use of a refrigerant liquid stored at a pressure above atmospheric pressure, so that the refrigerant vapor could be released directly to the atmosphere. Unfortunately, many available refrigerant liquids for such a system are either flammable, toxic, harmful to the environment, or exist in liquid form at such high pressures that they represent an explosion hazard in quantities suitable for the intended purpose. Conversely, other available refrigerant liquids acceptable for discharge into the atmosphere (such as carbon dioxide) have relatively low heat capacities and latent heats of vaporization. As a result, some cooling devices which release carbon dioxide are more bulky than is commercially acceptable for a portable device.

An alternate procedure for providing a cooling effect in a portable device is to absorb or adsorb the refrigerant vapor in a chamber separate from the chamber in which the evaporation takes place. In such a system, the refrigerant liquid boils under reduced pressure in a sealed chamber and absorbs heat from its surroundings. The vapor generated from the boiling liquid is continuously removed from the first chamber and discharged into a second chamber containing a sorbent that absorbs or adsorbs the vapor.

SUMMARY OF THE INVENTION

The invention provides methods for the preparation of refrigerant materials used in evaporation/condensation-type self-refrigerating devices, and refrigerant materials which are produced with these methods. The invention is born out of the requirement for high efficiency vaporization of the refrigerant in such devices.

In one aspect, the invention provides a method for preparing an evaporator chamber for use in a portable, single-use, non-releasing evaporation-type refrigerator. The method includes forming a mixture of a volatile non-aqueous solvent (for example, short chain alcohols, including methanol) and a refrigerant dispersant (for example, acrylic-based polymers and copolymers, starch-graft polymers and copolymeric acrylates, including copolymer of acrylamide and an alkali salt of acrylic acid), depositing this mixture (which can be of from about 10 to about 70% by weight of volatile solvent, and from about 30 to about 90% by weight of polymeric material). On the inner surface of an evaporator chamber (in some instances, deposited on substantially the entire inner surface of said evaporator chamber, which, in some circumstances, is covered with a protective lacquer, and which also may be aluminum), over which the refrigerant dispersant is deposited), evaporating the volatile solvent to leave a substantially even coating of refrigerant dispersant on the inner surface of the evaporator chamber, loading the coating of refrigerant dispersant with a refrigerant (for example, water)to produce a substantially even layer of refrigerant intimately associated with the coating of refrigerant dispersant (the layer thickness of refrigerant and dispersant can be up to about 0.03 inches), removing gas from the evaporator chamber by evacuating the evaporator chamber (for example, to a pressure of riot more than about 20 milliTorr), and, sealing the evaporator chamber to prevent re-introduction of gas to the evaporator chamber. The evaporator chamber is also equipped with a means for controlling fluid communication between the interior of the evaporator chamber and an external vessel of lower pressure, for example a sorber chamber separated from the evaporator chamber by a valve and an actuator for preventing fluid communication between the sorber chamber and evaporator chamber until activation of the device. The evaporator chamber is also adapted to provide thermal transfer between its interior and exterior surfaces.

In another aspect, the invention provides a sealed and evacuated evaporator chamber including a gas-tight chamber evacuated to a pressure of not more than about 20 milliTorr, a substantially even layer of refrigerant dispersant coating at least a portion of the inner surface of the gas-tight chamber, a substantially even layer of refrigerant adhered to that layer of refrigerant dispersant; and a means for controlling fluid communication between the interior of the chamber and a lower pressure vessel. The evaporator chamber can be equipped with a means for controlling fluid communication between the interior of the evaporator chamber and an external vessel of lower pressure. The evaporator chamber can be adapted to provide thermal transfer between its interior and exterior surfaces. In another aspect, the invention provides a method of cooling a product with the portable, single-use, non-releasing evaporation-type refrigerator by operating the means for preventing refrigerant vapor flow, thereby permitting this flow. The pressure in the evaporator chamber is reduced subsequent to such operation, causing the refrigerant to vaporize and form a refrigerant vapor, the vapor is collected by the sorbent material in the sorber, and heat is generated in the sorbent. Then, by removing the vapor from the evaporator chamber by collecting the vapor until an equilibrium is reached, where the sorbent is substantially saturated or substantially all the refrigerant has been collected in the sorbent material and containing the heat generated in the sorbent within the sorber by means of the phase change-type heat sink material, the product is cooled.

The invention provides a self-contained and disposable refrigeration device. The device according to the invention does not vent a gas or vapor of any kind. There are no hazardous or toxic materials or components included in the device, and recycling of the materials of the device is facilitated. There are no pressurized gases present in the device and no environmentally objectionable materials such as unstable refrigerants. The device does not explode, even when consumed by fire, and is not flammable.

The methods of refrigerant dispersion provided by the invention are designed to allow for highly efficient and controlled vaporization of refrigerant in portable, single use, non-releasing evaporation-type refrigeration devices. The materials and methods of the present invention allow a substantially even layer of refrigerant to be vaporized from the inner surfaces of evaporator chambers of such refrigeration devices. This substantially even layer of refrigerant is maintained throughout the entire storage life of the refrigeration device despite the influence of gravity and the inevitable jarring that occurs in normal handling of such refrigeration devices.

As used in the specification, a "substantially even layer" refers to layers of refrigerant materials and refrigerant dispersants which are not more than about twice as thick in one location of the surface they cover as in another such location. The refrigerants are to be dispersed on refrigerant dispersants when dispersants are employed, otherwise the refrigerant materials are to be dispersed on the inner surfaces of evaporator chambers, whether the surface is coated or not. The refrigerant dispersants, when employed, are to be dispersed on the inner surfaces of evaporator chambers, whether the surface is coated with any type of protective coating or not. As used in the specification, "short chain" refers to organic molecules containing from one to four carbon atoms. As used in the specification, "copolymers" include both random and block copolymers.

Unless otherwise defined, all technical and scientific terms used herein have the same meaning as commonly understood by one of ordinary skill in the art to which this invention belongs. Although methods and materials similar or equivalent to those described herein can be used in the practice of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DETAILED DESCRIPTION OF THE INVENTION

The self-refrigerating device used in the present invention includes three basic sections: an evaporator chamber containing a refrigerant, an evacuated sorbent chamber containing a sorbent and a heat sink material, and a means to prevent the flow of refrigerant vapor between the evaporator chamber and the sorbent chamber. This flow-preventing means is also adapted to allow the flow of refrigerant vapor between the evaporator and sorbent chambers, such as when the device is in operation. The functional relationships between these sections in a particular refrigeration device have been roughly described in U.S. Pat. Nos. 5,197,302 and 5,048,301. The inventive devices are generally utilized in conjunction with a product to be cooled. These products and associated uses will be detailed after discussion of the device itself, which follows directly below.

Figure 1:
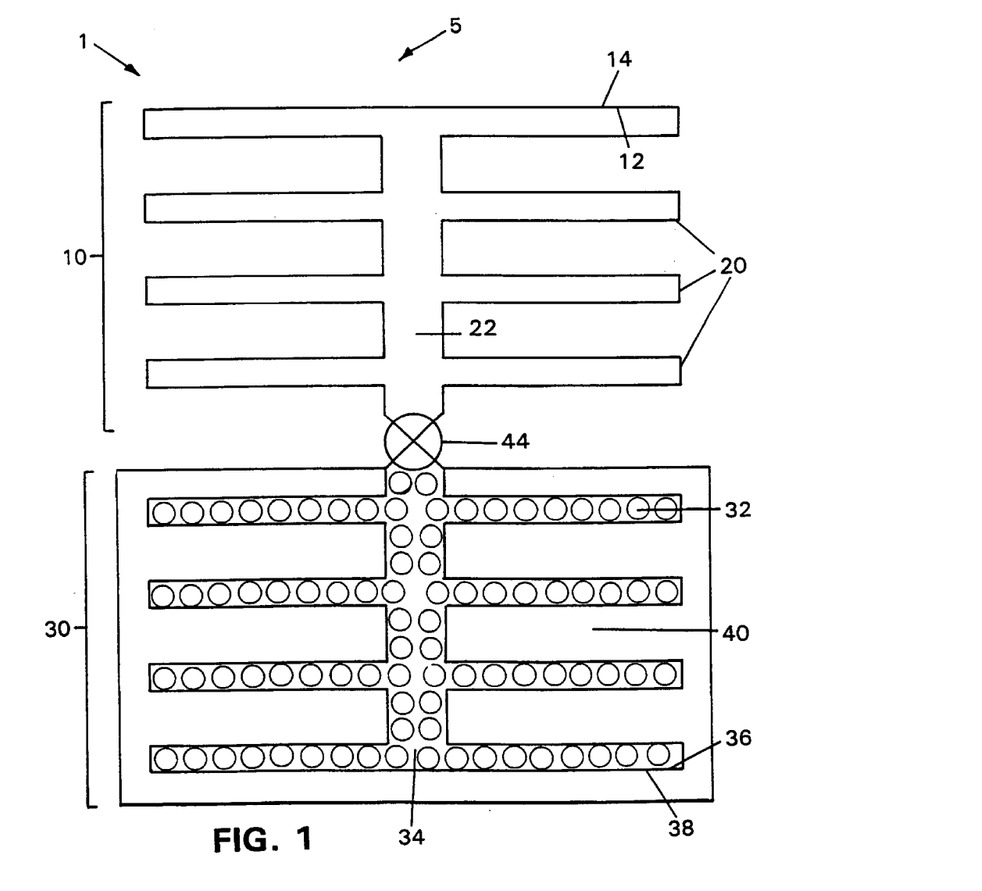
FIG. 1 is a schematic diagram of a refrigeration device useful in certain embodiments of the invention.
Figure 2:
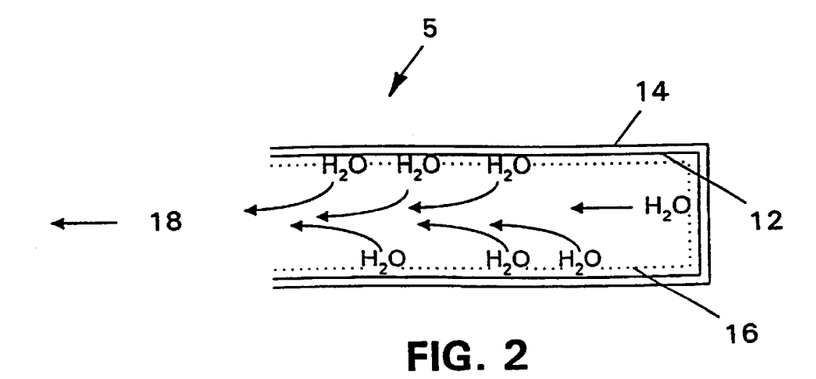
FIG. 2 is a schematic diagram of evaporation and cooling processes occurring at the evaporation chamber during operation of a particular embodiment of the refrigeration device.

Regarding FIG. 1, a particular embodiment of refrigeration device 1 according to the general principles of the invention is displayed. This view shows product 5 which is to be cooled, in contact with evaporator 10, within which evaporation of a refrigerant takes place. Evaporator 10 comprises a chamber within which evaporation of a refrigerant takes place. This generally involves desorption of refrigerant from a surface during the operation of the device. Before the device is activated, the refrigerant is present in the evaporator, both in liquid and vaporous states. In devices such as the present invention, this desorption is driven by a pressure differential which is manifested when refrigerant vapor flow-preventing means 44 is operated. Thus, activation of the device amounts to allowing refrigerant vapor flow. As desorption takes place from the inner surface 12 of evaporator chamber 10, the outer surface 14 becomes cold. This in turn is able to cool product 5 in thermal contact with outer evaporator surface 14. This is represented in FIG. 2, showing the desorption of refrigerant ($H_2O$) proceeding in direction 18 leading toward lower pressure. This lower pressure is exposed to the refrigerant upon operation of the refrigeration device, as explained herein.

A wide variety of refrigerants are operative in the device. The general requirements are that the refrigerants be vaporizable and condensable at pressures which can be relatively easily attained in chambers. The refrigerant must also be compatible with the sorbent, that is, it must be capable of being absorbed or adsorbed by the sorbent. Suitable choices for refrigerants must also be those which are able to produce a useful change in temperature in a short time, meet government safety standards, and be relatively compace. The refrigerants used in the devices of the present invention preferably have a high vapor pressure at ambient temperature, so that a reduction of pressure will result in a high vapor production rate. The vapor pressure of the refrigerant at 20° C. is preferably at least about 9 mmHg. Moreover, for some applications (such as cooling of food products), the refrigerant should conform to applicable government standards in case any discharge into the surroundings, accidental or otherwise, occurs. Refrigerants with suitable characteristics for various uses of the invention include: various alcohols, such as methyl alcohol and ethyl alcohol; ketones or aldehydes, such as acetone and acetaldehyde; ammonia; water; short chain hydrocarbons and short chain halo-hydrocarbons; and freons, such as freon C318, 114, 21, 11, 114B2, 113 and 112. A preferred refrigerant is water.

In addition, the refrigerant may be mixed with an effective quantity of a miscible nucleating agent having a greater vapor pressure than the refrigerant to promote ebullition so that the refrigerant evaporates even more quickly and smoothly, and so that supercooling of the refrigerant does not occur. Suitable nucleating agents include ethyl alcohol, acetone, methyl alcohol, propyl alcohol and isobutyl alcohol, all of which are miscible with water. For example, a combination of a nucleating agent with a compatible refrigerant might be a combination of 5% ethyl alcohol in water. The nucleating agent preferably has a vapor pressure at 25° C. of at least about 25 mm Hg. Alternatively, solid nucleating agents may be used, such as the conventional boiling stones used in chemical laboratory applications.

The desorption processes taking place in the evaporator chamber are most efficiently carried out if the layer of refrigerant is as thin as possible, to the limit of a monolayer of refrigerant spread over as much of the inner desorption chamber surface as possible. These thin films maximize the area for surface evaporation. Multiple layers of refrigerant cause heat transfer through layered refrigerant molecules to a refrigerant molecule which is disposed at the innermost surface of the evaporator. This type of refrigerant overloading results in a temperature difference across the refrigerant layer that is larger than would exist if the layer were thinner. Thus, overloading decreases heat conduction, reducing the efficiency of evaporation. In preferred embodiments with thin layers of refrigerant, the layer thickness is reduced as the refrigeration device operates, decreasing the temperature difference across the layer, improving heat conduction processes as the refrigerator operates. If a refrigerant dispersant is employed, this is also desirably layered as thinly as possible across as much of the internal evaporator chamber surface as possible.

FIG. 2 shows the desorption of refrigerant ($H_2O$) proceeding in direction 18 leading toward lower pressure. This lower pressure is exposed to the refrigerant upon operation of the refrigeration device, as explained herein. The particular embodiment illustrated in FIG. 2 uses water as the refrigerant, but the principles discussed will be applicable to vaporizable refrigerants in general.

The refrigeration devices according to the invention contain a fixed amount of non-circulating refrigerant. If the amount of product to be cooled and the amount of cooling desired are known, the amount of heat to be removed is easily calculated. The amount of heat to be removed specifies precisely the amount of refrigerant which must be evaporated from the evaporator chamber. For example, if 8 fluid ounces (236 mL) of an aqueous liquid is to be cooled by 22° C., about 8.9 grams of water refrigerant is needed as a theoretical minimum. If heat leaks back into the system, more refrigerant will be required.

As mentioned above, the refrigerant desirably forms a layer on inner surface 12 of evaporator 10. This layer of refrigerant is preferably substantially evenly distributed over as much of surface 12 as possible. In certain embodiments of the invention, this will be accomplished with the aid of refrigerant dispersant 16, which is. preferably deposited in a layer on inner evaporator chamber surface 12, and covers as much of this surface as possible. The layer of dispersant is adapted to allow refrigerant to be absorbed into and/or adsorbed onto it. Useful dispersants can absorb at least about 20 grams of refrigerant per gram of dispersant, preferred dispersants can absorb at least about 30 grams of refrigerant per gram of dispersant. In such an arrangement, heat flows from the product across the wall of the evacuator chamber, across a layer of refrigerant dispersant, and then vaporizes the surface refrigerant molecules from the dispersant.

In selecting the refrigerant dispersant, any of a number of materials may be chosen, depending upon the requirements of the system and the particular refrigerant liquid being used. The refrigerant dispersant may be something as simple as cloth or fabric having an affinity for the refrigerant and a substantial wicking ability. Thus, for example, when the refrigerant is water, the refrigerant dispersant may be cloth, sheets, felt or flocking material which may be comprised of cotton, filter material, natural cellulose, regenerated cellulose, cellulose derivatives, blotting paper or any other suitable material. It is important that the refrigerant dispersant be able to be applied to a surface which is highly thermally conductive, such as a metal-containing surface.

The most preferred refrigerant dispersant would be highly hydrophilic, such as gel-forming polymers which would be capable of coating the interior surface of the evaporation chamber. Such materials preferably consist of alkyl, aryl and amino derivative polymers of vinyl-chloride acetate, vinylidene chloride, tetrafluoroethylene, methyl methacrylate, hexaneodic acid, dihydro-2,5-furandione, propenoic acid, 1,3-isobenzofurandione, 1-h-pyrrole-2,5-dione or hexahydro-2-h-azepin-2-one. Also useful as refrigerant dispersants in the present refrigeration devices are random and block copolymers made up of monomers of alkyl, aryl and amino derivatives of propenoic acids, alkali metal propanoates, vinyl-chloride acetate, vinylidene chloride, tetrafluoroethyl-ene, methyl methacrylate, hexaneodic acid, dihydro-2,5-furandione, 1,3-isobenzofurandione, 1h-pyrrole- 2,5-dione or hexahydro-2-h-azepin-2-one. Corn starch graft polymers and copolymers of alkyl, aryl and amino derivative polymers of vinylchloride acetate, vinylidene chloride, tetrafluoroethyl-ene, methyl methacrylate, hexaneodic acid, dihydro-2,5-furandione, propenoic acid, 1,3-isobenzofurandione, 1 h pyrrole-2,5-dione or hexahydro-2-h-azepin-2-one are also suitable for use in the present invention. Other useful dispersants are members of the classes of saponified starchpolyacrylonitrile graft copolymers, crosslinked/-grafted cellulose, saponified vinyl acetate-acrylic acid copolymers, starch grafted polyvinyl acetate, and alkali metal salts of polyacrylate hydrocolloid particles. Useful refrigerant dispersants are commercially available, including poly (2-propenamide-co-2-propenoic acid, sodium salt), sold as WATER LOCK G-400 (Grain Processing Corp., Muscatine, Iowa), and starch graft poly (2-propenamide-co-2-propenoic acid, mixed sodium and aluminum salt), sold as WATER LOCK D-223 (Grain Processing Corp.).

The particle or grain size of such materials has been observed to be of some importance, with smaller grains generally giving better results. In some embodiments, polymeric materials which are able to pass 98% of their particles through a mesh size of at least 40 are used. In other embodiments, the mesh size through which 98% of the polymer particles pass is 80 mesh. Suitable dispersants are able to absorb at least about 300 grams of refrigerant per gram of dispersant. Prefer-ed dispersants are able to absorb at least about 400 grams of refrigerant per gram of dispersant, and most preferred dispersants are able to absorb at least about 450 grams of refrigerant per gram of dispersant.

The refrigerant dispersant may be sprayed, flocked, or otherwise coated or applied onto the interior surface of the evaporator chamber. In a particular embodiment, the refrigerant dispersant is electrostatically deposited onto that surface. In another embodiment, the refrigerant dispersant is mixed with a suitable solvent, such as a volatile non-aqueous solvent, and then the solution is applied to the interior surface of the first chamber. The volatile solvent can be chosen from short chain alcohols, short chain esters, and short chain ethers, acetone, and similar solvents with slight to moderate polarity.

The application of refrigerant dispersant should be carried out to produce a layer of refrigerant and dispersant which is of a substantially uniform thickness. This thickness should range from about 0.015 to about 0.040 inches. If the refrigerant and dispersant layer is too thick or too thin, the layer will not properly adhere to the interior surface of the evaporator. The inner surfaces of an evaporator chamber may be coated with a thin (up to about 0.1 mil) of a lacquer film, the nature of which will be apparent to those of skill in the beverage packaging industry. This lacquer layer can become necessary for the successful application of some refrigerant dispersants that are degraded by metal ions which can be present in some inner surfaces of evaporator chambers. The presence of this thin layer of lacquer does not present a problem with respect to heat transfer into the evaporator chamber, or adherence of the refrigerant dispersant to the inner surfaces.

When the refrigerant dispersant is applied by mixing solvent and dispersant, the thickness of this layer is primarily determined by the amount of dispersant which is applied to the evaporator chamber inner surface, and also by the amount of refrigerant which is applied to this surface. As the ratio of volatile solvent to refrigerant dispersant decreases, the thickness of the deposited dispersant layer increases. Suitable ranges for the volatile solvent to dispersant ratios are from about 50 or 100 to about 1 by weight.

Upon mixing the volatile solvent and dispersant, the mixture is applied to the inner surface of the evaporator chamber of the refrigeration device of the invention. As much of this inner surface as possible is coated with the mixture. The volatile solvent is then removed, most conveniently by volatilization, such as with heat or reduced pressure. The solvent is removed to dryness, leaving a residue of refrigerant dispersant which can be loaded with refrigerant.

In another embodiment, the refrigerant dispersant is able to control any violent boiling in the evaporator and thus reduces any liquid entrainment in the vapor phase. In such an embodiment, the refrigerant dispersant is a polymer forming a, porous space-filing or sponge-like structure, and it may fill all or part of the evaporator chamber.

Upon loading the dispersant with refrigerant, the combination is required to allow the release of refrigerant upon reduction in pressure. The reduction in pressure occurs when the refrigeration device is activated. The dispersants and methods of dispersing refrigerants discussed herein can be used, not only in the refrigeration devices disclosed herein, but also in other refrigeration devices, such as those disclosed in U.S. Pat. Nos. 5,197,302 and 5,048,301.

Figure 3:
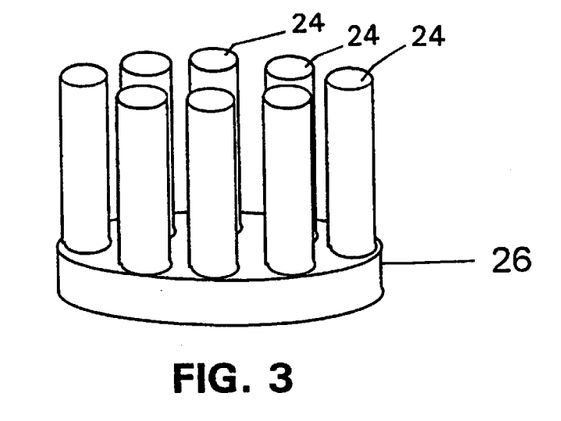
FIG. 3 is a perspective view of a circular arrangement of evaporator fingers which can be used in particular embodiments of the invention.
Figure 4:
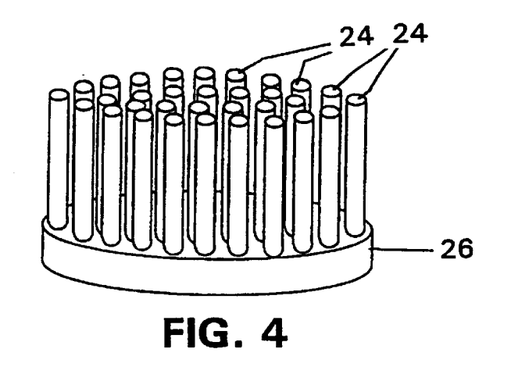
FIG. 4 is a perspective view of a concentric circular arrangement of evaporator fingers which can be used in particular embodiments of the invention.
Figure 5:
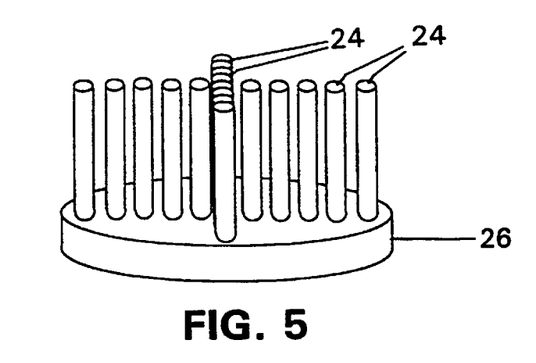
FIG. 5 is a perspective view of a cruciform arrangement of evaporator fingers which can be used in particular embodiments of the invention.

In the particular embodiment shown in FIG. 1, evaporator 10 has fins 20 and a central passage 22, although a wide variety of shapes and configurations of the evaporator are possible. If fins are used, they can be of a large variety of configurations, and the central passage may be omitted or substantially shortened. In other embodiments, evaporator 10 takes the form of a number of hollow finger-like elements (fingers 24) which do not branch from a central passage as do fins 20, but pass into finger base 26, shown in FIGS. 4–6. Base 26 can contain short passages (not shown) to connect the interior of hollow fingers 24 together to form a short central passage. Alternatively, base 26 can be substantially hollow, with a central outlet leading to the means for preventing/allowing vapor flow to the absorber. Fingers 24 can be arranged in a circle (eight fingers are shown in this arrangement in FIG. 3, but any number could be so arranged), a number of concentric circles (shown in FIG. 4), in a cruciform arrangement (shown in FIG. 5), or a more random arrangement. The general aim is to provide for efficient heat transfer from the bulk medium to inner evaporator 12, by maximizing the area of this surface. The evaporator is desirably also reasonably simple to manufacture and assemble. Additionally, refrigerant vapor flow paths inside the evaporator chamber are desirably adequate to prevent excessive pressure drops in the low density vapor flows.

Normal boiling processes (ebullition), which are initiated by streams of tiny bubbles rising from discrete and easily visible spots on surfaces, require nucleation sites consisting of reentrant cavities containing non-condensable gases such as air. The evaporator chamber in refrigerators according to the present invention is subjected to partial evacuation, effectively removing nucleation sites from the internal surfaces of the evaporator chamber, and degasses the refrigerant as well. Thus, refrigerant molecules subjected to the evacuator chamber preparation methods (disclosed herein) required by refrigerators of the present invention, when exposed to the reduced pressure present in a properly prepared sorbent chamber evaporate from the surface of a quiescent pool of refrigerant. Heat transfer in such a pool is subject to the same limitations of conduction and convection as in bulk fluids.

The refrigerant vapor pressure within the evaporator chamber at the begimiing and end of the cooling process can be determined from the equilibrium vapor pressure-temperature function for water, based on the expected beverage temperatures and temperature differences required for heat transfer.

It is desirable to carry out an evacuation of the refrigerant-loaded evaporator chamber prior to assembly. The evacuation should be limited to pressures above or equal to the vapor pressure of water at the temperature at which the evacuation is carried out. For example, at room temperature with water as the refrigerant, the evacuation of the refrigerant-loaded evaporator should be carried out to pressures of about 20 Ton-. This evacuation serves to sweep contaminants such as air, wash solvents and the like from the evaporator chamber.

Returning to FIG. 1, there is also shown sorber 30. This section of the refrigeration device includes sorbent 32, which is disposed throughout the interior of sorbent chamber 34. Also included in sorber 30 is heat sink 40. Refrigerant vapor which is formed upon operation of the refrigeration device moves from the evaporator chamber into sorbent chamber 34, carrying heat. This heat is deposited into finite capacity sorbent 32, and further deposited into finite capacity heat sink 40.

The sorbent receives heat not only from the latent heat of vaporization resulting from condensation of the refrigerant vapor, but also from the chemical reaction heat released when refrigerant is combined with the sorbent. Sorbent 32 is in thermal contact with heat sink 40, via internal surface 36 and external surface 38 of sorbent chamber 34. This thermal contact desirably results in highly efficient heat transfer from sorbent 32 to heat sink 40. This heat must be stored in the heat sink in such a manner that it does not leak back into the product during the time that cold product is required.

Gas molecules tend to adhere to surfaces. Sol-bent materials can have porous structures with a very large surface area per unit volume. The volume of noncondensable materials becomes significant in systems requiring final pressures below 220 to 500 milliTorr. As an example, a container filled with molecular sieve (a typical sorbent) can be evacuated at room temperature to a pressure of from about 1 to 5 milliTorr day after day, but will rise in pressure over a few hours to as much as 500 milliTorr between serial evacuations. This rise is attributable to the gradual desorption of sorbed gas molecules. It is unlikely that an economical high production rate refrigeration device could incorporate such a process in its manufacture. Since the sorption process in the sorbent acts as a pump to draw vapor from the evaporator during operation of the device, the refrigerant vapor pressure over the sorbent must at all times be well below the equilibrium saturation pressure of refrigerant in the evaporator. Essential to the usefulness of sorbents in the refrigeration devices discussed herein is the removal of noncondensable gases from the refrigeration system. The presence of non-condensable gases must be avoided anywhere in the system, for such gases are carried by the flowing refrigerant vapor into the sol-bent, or could be already present in the sorbent. The presence of non-condensable gases forms a barrier through which refrigerant vapor must diffuse before it can condense. If such gases are present, the refrigeration device will operate at a rate which is limited by the diffusion barrier.

In a similar way, the sorbent must be made as free of condensable gases as possible before the device is operated. The volume of the sorbent is desirably minimized for some preferred embodiments of the invention. Thus, competition between refrigerant and a condensable gas already present in the sorbent will also limit the operation of the refrigeration device to levels below optimum performance. Methods for preparing sorbents for use in refrigeration devices are detailed in U.S. Patent Application Ser. No. PCT/US00/04634 (publication number WO 00/50823, entitled "Preparation of Refrigerant Materials", filed contemporaneously herewith, and incorporated by reference in its entirety.

The sorbent chamber into which the sorbent is to be loaded also includes a heat sink material. The function of the heat sink material is to absorb heat released by the sorbent, and to prevent leakage of this heat back to the product which is to be cooled by the refrigeration device. Thus, it is critical to maximize the thermal contact between the sorbent and the heat sink material.

Materials which are suitable as sorbents are those which have aggressive refrigerant vapor-binding properties, low chemical reaction heats, and are not explosive, flammable or toxic. These materials are available in a variety of forms, including flakes, powders, granules, as well as supported on inert shapes or bound with clays. It is desirable that the material have sufficient vapor flow passages through it that refrigeration performance is not limited by the passage of refrigerant vapor through the sorbent. Additionally, the sorbent must be able to transfer heat to the heat sink material, and thus be in good thermal contact with the inner surface of the sorbent chamber. Preferred sorbents for use in the present refrigeration device include flaked sorbent or clay-supported sorbent. The latter is available in a wide variety of shapes, including spheres, chips, rectangular solids.

Synthetic zeolite materials comprising metallic alumino silicates can be used in the present refrigeration devices. These materials include a water absorbing mineral supported by a porous inert clay. Such materials must be heated to drive absorbed and adsorbed water from them. The amount of sorbent required to absorb refrigerant vapor depends on the sorption capability of the sorbent for the refrigerant vapor. This is generally a function of temperature. Within the sorbent temperature range of interest, water absorption ranges from about 10% to about 25% by weight. For an 8 ounce, 22° C. temperature drop system, 45 to 90 grams of sorbent would be required, an amount which also depends on the effectiveness of the heat sink.

The refrigeration device of the present invention also includes a heat sink located in the sorber. The heat sink is in thermal contact with the outer surface of the sorbent chamber, and thus is in thermal contact with the sorbent.

The heat-removing material may be one of three types: (1) a material that undergoes a change of phase when heat is applied; (2) a material that has a heat capacity greater than the sorbent; or (3) a material that undergoes an endothermic reaction when brought in contact with the liquid refrigerant.

Suitable phase change materials for particular applications may be selected from paraffin, naphthalene, sulphur, hydrated calcium chloride, bromocamphor, cetyl alcohol, cyanimede, eleudic acid, lauric acid, hydrated sodium silicate, sodium thiosulfate pentahuydrate, disodium phosphate, hydrated sodium carbonate, hydrated calcium nitrate, Glauber's salt, potassium, sodium and magnesium acetate. The phase change materials remove some of the heat from the sorbent material simply through storage of sensible heat. In other words, they heat up as the sorbent heats up, removing heat from the sorbent. However, the most effective function of the phase change material is in the phase change itself An extremely large quantity of heat can be absorbed by a suitable phase change material in connection with the phase change (i.e., change from a solid phase to a liquid phase, or change from a liquid phase to a vapor phase). There is typically no change in the temperature of the phase change material during the phase change, despite the relatively substantial amount of heat required to effect the change; which heat is absorbed during the change. Phase change materials which change from a solid to a liquid, absorbing from the sorbent their latent heat of fusion, are the most practical in a closed system. However, a phase change material changing from a liquid to a vapor is also feasible. Thus, an environmentally-safe liquid could be provided in a separate container (not shown) in contact with the sorbent material (to absorb heat therefrom)but vented in such a way that the boiling phase change material carries heat away from the sorbent material and entirely out of the system.

Another requirement of any of the phase change materials is that they change phase at a temperature greater than the expected ambient temperature of the material to be cooled, but less than the temperature achieved by the sorbent material upon absorption of a substantial fraction (i.e., one-third or one-quarter) of the refrigerant liquid. Thus, for example, in most devices according to the present invention which are intended for use in cooling material such as food or beverage, the phase change material could change phase at a temperature above about 30° C., preferably above 35° C., but preferably below about 70° C., and most preferably below 60° C. Of course, in some applications, substantially higher or lower phase change temperatures may be desirable. Indeed, many phase change materials with phase change temperatures as high as 90° C., or 110° C. may be appropriate in certain systems.

Materials that have a heat capacity greater than that of the sorbent simply provide a thermal mass in contact with the sorbent that does not effect the total amount of heat in the system, but reduces the temperature differential between the material being cooled and the sorber, with two results.

When heat is added to a material which does not melt or evaporate as a result of that heat addition, the heat can be sensed by an increase in temperature. By contrast, if the material undergoes a phase change, from solid to liquid for example, the material can absorb heat without a sensible temperature change. The heat energy instead goes into the phase change of the material. The hidden heat is referred to as latent heat. Heat sink materials useful in the present refrigeration device are all melting materials, they absorb significant latent heat, and are able to keep the sorbent at a more even temperature. The cooler the sorbent, the more vapor it can condense, so it is the combined volume of heat sink and sorbent that is of direct interest. A low density material and a high density material may, in principle, has equal total heat capacity, but a refrigeration device utilizing the low density material will require more volume. This increased volume can be undesirable in certain critical applications.

The refrigeration device of the present invention also includes a heat sink located in the absorber. The heat sink is in thermal contact with the outer surface of the sorbent chamber, and thus is in thermal contact with the sorbent.

The amount of heat sink material required depends on the amount of refrigerant vapor to be absorbed by the sorbent, the chemical reaction heat of the sorbent and refrigerant vapor binding reaction, the specific heat of the heat sink (or specific heat-latent heat combination in a phase-change material), and the chosen final temperature of the absorber. Since most sorbents decrease in refrigerant vapor sorption capability as the temperature increases, there is a ratio of sorbent to heat sink which yields minimum system mass, and which depends on the properties of the chosen pair.

Suitable phase change materials and methods for their preparation are detailed in U.S. Patent Application Ser. No. PCT/US00/04637 (publication number WO 00/50827), entitled "Preparation of Heat Sink Materials", filed contemporaneously herewith, and incorporated by reference in its entirety.

The refrigeration device also includes a means for preventing refrigerant vapor flow from the evaporator chamber to the sorbent chamber before operation of the device. Upon activation of this means, which subsequently allows the flow of refrigerant vapor from the evaporator chamber to the sorbent chamber, desorption and cooling of product begins. The means for preventing vapor flow can take the form of any of the various types shown in the prior art. The means can be located at any location between the evaporator chamber and the sorber, so long as it prevents refrigerant vapor, or vapor of any kind from being sorbed by the sorbent. However, if the entire refrigeration device is contained within a pressurized container, a pressure responsive valve can be used which can actuate the device upon the release of the pressure within the container.

The device can be constructed of a variety of materials, with the restriction that certain portions must be able to afford good thermal contact with certain other portions. These portions must be made of a relatively good thermal conductor such as a metal or metallic material. Preferred materials for the evaporator chamber, and sorber include metals such as aluminum, copper, tin, steel, and metal alloys such as aluminum alloy. For some applications, corrosion protection will be required on the outer surface of the evaporator. Corrosion protection can include a thin coating of a lacquer specially designed for that purpose. Those of skill in the art will be able to provide suitable materials. The thickness of such coatings generally does not interfere with thermal transfer, but the choice of corrosion protectant will be dictated by the affect such protectant has on the heat transfer. Portions of the refrigerator which are not crucial to thermal transfer include the means for preventing/allowing refrigerant vapor flow. This portion can be made of a polymeric material, such as a thermoplastic material.

Figure 6:
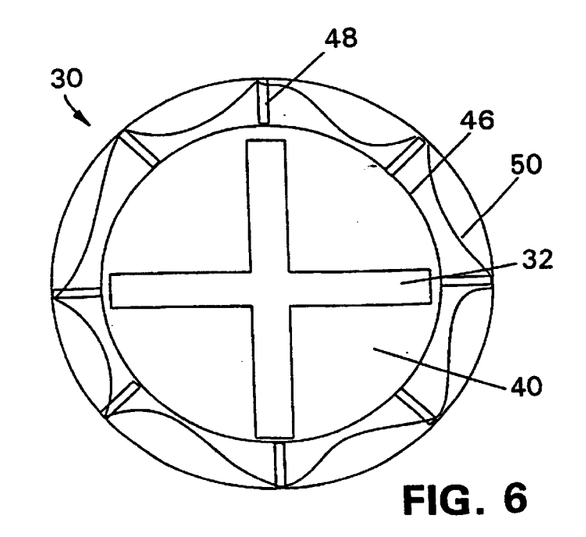
FIG. 6 is an overhead view of a particular embodiment of a refrigeration device according to the invention disposed in a cylindrical product container.

The refrigerators are subjected to external pressure, since they are evacuated internally. In order to avoid the necessity of fabricating a heavy structure, self-supporting arch designs or ribbed designs can be used. Materials with similar gauge to those employed in the construction of carbonated beverage cans are able to find application in the construction of the inventive refrigerators. A particular embodiment of a self-supporting arch design is depicted in FIG. 6. Sorber 30 is shown having sorber 32 and heat sink material 40 included in its interior. On outer surface 46 of sorber 30 are a series of spacers 48. They generally continue around the circumference of surface 46, but some are omitted from FIG. 6 for clarity. There is intermediate material 50 attached to spacers 48 across the entire circumference of surface 46. The assembly is meant to be placed in a cylindrical product container, with the terminal portions of spacers 48 abutting the inner walls of the cylindrical product container. This assembly assists the sorber to maintain its structure, preventing collapse from pressure inequalities between the interior and exterior of the sorber.

The product which can be cooled can be a liquid, gas or solid, as long as good thermal contact is made with the outer surface of the evaporator. Preferred products to be cooled are liquids or gases, most preferably liquids. Among the liquids which can be cooled using the refrigeration device of the invention are those comprising water, such as those comprising at least 20% water, those comprising at least 40% water, and those comprising at least 60% water. Included among such water-containing liquids are water itself, milk, fruit and vegetable juices, soft-drinks, beer, wine, and mixed drinks. These products can be contained in vessels of various sizes and shapes, and those made of various materials. As mentioned above, certain applications will involve the cooling of liquids which can, over lengthy storage times, corrode the containers in which they are stored. Corrosion protection, known to those skilled in the art, is available in such instances.

The invention also includes a method of using the refrigeration device described herein. The method includes the step of providing a refrigeration device of the type set fort herein, opening the means for preventing vapor flow, whereby the pressure in the evaporator is reduced, causing the refrigerant to be vaporized, which vapor is collected by the sorbent, removing the vapor from the evaporator by collecting the vapor until an equilibrium condition is reached wherein the sorbent is substantially saturated or substantially all the refrigerant originally in the evaporator chamber has been collected in the sorbent, and simultaneously removing heat from the sorbent by means of the heat sink material described above. The process is preferably a one-shot process; thus, opening the means for preventing/ allowing flow is preferably irreversible. At the same time, the system is a closed system; in other words, the refrigerant does not escape from the system, and ther is no means by which the refrigerant or the sorbent may escape either the evaporator chamber or the sorber.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for preparing an evaporator chamber for use in a portable, single-use, non-releasing evaporation-type refrigerator, the method comprising:
   A) forming a mixture of a volatile non-aqueous solvent and a refrigerant dispersant;
   B) depositing said mixture on the inner surface of an evaporator chamber;
   C) evaporating said volatile solvent to leave a substantially even coating of refrigerant dispersant on said inner surface of said evaporator chamber;
   D) loading said coating of refrigerant dispersant with refrigerant water to produce a substantially even layer not more than about 0.03 inches thick of refrigerant water intimately associated with said coating of refrigerant dispersant;
   E) removing gas from the evaporator chamber by evacuating said evaporator chamber; and
   F) sealing the evaporator chamber to prevent re-introduction of gas to said evaporator chamber,
   wherein the evaporator chamber is equipped with a means for controlling fluid communication between the interior of the evaporator chamber and an external vessel of lower pressure, and wherein the evaporator chamber is adapted to provide thermal transfer between its interior and exterior surfaces.

2. The method of claim 1, further comprising a sorber chamber separated from the evaporator chamber by a means for preventing fluid communication between the sorber chamber and evaporator chamber until activation of the device.

3. The method of claim 1, wherein the volatile solvent is selected from the group consisting of short chain alcohols.

4. The method of claim 1, wherein the refrigerant dispersant is a polymeric material is selected from the group consisting of acrylic-based polymers and copolymers, starch-graft polymers and copolymeric acrylates.

5. The method of claim 1, wherein the mixture comprises from about 10 to about 70% by weight of volatile solvent, and from about 30 to about 90% by weight of polymeric material.

6. The method of claim 1, wherein the mixture is deposited on substantially the entire inner surface of said evaporator chamber.

7. The method of claim 1, wherein substantially all of the inner surface of the evaporator chamber is covered with a protective lacquer, over which the refrigerant dispersant is deposited.

8. A method for preparing an evaporator chamber for use in a evaporation-type refrigerator, the method comprising:
   A) forming a mixture of a methanol and a copolymer of acrylamide and an alkali salt of acrylic acid;
   B) depositing said mixture on the lacquer-protected inner surface of an aluminum evaporator chamber;
   C) evaporating said methanol to leave a coating of said copolymer on said inner surface of said evaporator chamber;
   D) loading said coating of copolymer with water to a combined water/copolymer layer thickness of not more than about 0.03 inches;
   E) evacuating said evaporator chamber to a pressure of not more than about 20 milliTorr; and
   F) sealing the evaporator chamber to prevent re-introduction of gas to said evaporator chamber,
   wherein the evaporator chamber is equipped with a means for controlling fluid communication between the interior of the evaporator chamber and a sorber, which is maintained at a pressure of not more than about 15 milliTorr, and wherein the evaporator chamber is adapted to provide thermal transfer between its interior and exterior surfaces.

9. A sealed and evacuated evaporator chamber comprising:
   A) a gas-tight chamber evacuated to a pressure of not more than about 20 milliTorr;
   B) a substantially even layer of refrigerant dispersant coating at least a portion of the inner surface of said gas-tight chamber;
   C) a substantially even layer of refrigerant adhered to said layer of refrigerant dispersant; and
   D) a means for controlling fluid communication between the interior of said chamber and a lower pressure vessel,
   wherein the evaporator chamber is equipped with a means for controlling fluid communication between the interior of the evaporator chamber and an external vessel of lower pressure, and wherein the evaporator chamber is adapted to provide thermal transfer between its interior and exterior surfaces.

10. The evaporator chamber of claim 9, wherein the refrigerant is water.

11. The evaporator chamber of claim 9, wherein the refrigerant dispersant is a copolymer of acrylamide and an alkali metal salt of acrylic acid.

12. The evaporator chamber of claim 9, wherein the means for controlling fluid communication comprises a frangible seal and an actuator.

13. An evaporator chamber produced according to the method of claim 1.

14. A method of cooling a product with a portable, single-use, non-releasing evaporation-type refrigerator that produces refrigerant vapor during evaporative heating, the method comprising:
   A) providing a portable, single-use, non-releasing evaporation-type refrigerator comprising:
      1) an evaporator chamber in thermal contact with a product to be cooled, wherein the evaporator chamber comprises a refrigerant, dispersed in a substantially even layer, and in intimate contact with a substantially even layer of polymeric refrigerant dispersant selected from the group consisting of acrylic-based polymers and copolymers, starch-graft polymers and copolymeric acrylates, wherein the evaporator chamber is evacuated to a pressure of not more than about 20 Torr;

2) an evacuated sorber comprising a sorbent in thermal contact with a phase change-type heat sink material;

3) a means for preventing refrigerant vapor flow between the evaporator chamber and the sorber, until operation of the device;

B) operating the means for preventing refrigerant vapor flow, thereby permitting said flow, whereby the pressure in the evaporator chamber is reduced, causing the refrigerant to vaporize and form a refrigerant vapor, the vapor collected by the sorbent material in the sorber, and heat is generated in the sorbent;

C) removing the vapor from the evaporator chamber by collecting the vapor until an equilibrium is reached, wherein the sorbent is substantially saturated or substantially all the refrigerant has been collected in the sorbent material; and D) containing the heat generated in the sorbent within the sorber by means of the phase change-type heat sink material.

15. A method for preparing an evaporator chamber for use in a portable, single-use, non-releasing evaporation-type refrigerator, the method comprising:

(A) forming a mixture of a volatile non-aqueous solvent and a refrigerant dispersant;

(B) depositing said mixture on the inner surface of an evaporator chamber;

(C) evaporating said volatile solvent to leave a substantially even coating of refrigerant dispersant on said inner surface of said evaporator chamber;

(D) loading said coating of refrigerant dispersant with a refrigerant to produce a substantially even layer of refrigerant intimately associated with said coating of refrigerant dispersant;

(E) removing gas from the evaporator chamber by evacuating said evaporator chamber to a pressure of not more than about 20 milliTorr; and (F) sealing the evaporator chamber to prevent re-introduction of gas to said evaporator chamber, wherein the evaporator chamber is equipped with a means for controlling fluid communication between the interior of the evaporator chamber and an external vessel of lower pressure, and wherein the evaporator chamber is adapted to provide thermal transfer between its interior and exterior surfaces.

16. The method of claim 15, further comprising a sorber chamber separated from the evaporator chamber by a means for preventing fluid communication between the sorber chamber and evaporator chamber until activation of the device.

17. The method of claim 15, wherein the volatile solvent is selected from the group consisting of short chain alcohols.

18. The method of claim 15, wherein the refrigerant dispersant is a polymeric material is selected from the group consisting of acrylic-based polymers and copolymers, starch-graft polymers and copolymeric acrylates.

19. The method of claim 15, wherein the mixture comprises from about 10 to about 70% by weight of volatile solvent, and from about 30 to about 90% by weight of polymeric material.

20. The method of claim 15, wherein the mixture is deposited on substantially the entire inner surface of said evaporator chamber.

21. The method of claim 15, wherein substantially all of the inner surface of the evaporator chamber is covered with a protective lacquer, over which the refrigerant dispersant is deposited.

* * * * *